Figure 1:
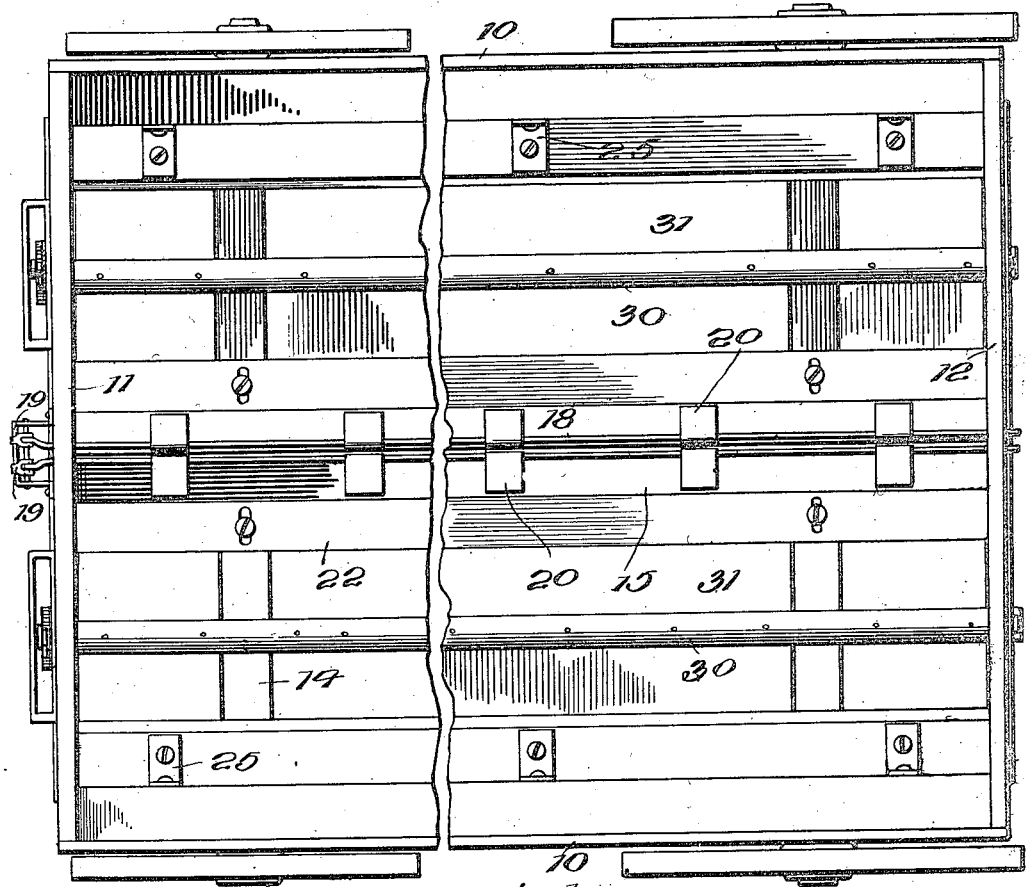

W. McEWAN.
DUMPING WAGON.
APPLICATION FILED AUG. 10, 1915.

1,210,822.

Patented Jan. 2, 1917.
2 SHEETS—SHEET 1.

Inventor
William McEwan

By [signature], Attorneys

W. McEWAN.
DUMPING WAGON.
APPLICATION FILED AUG. 10, 1915.
1,210,822.
Patented Jan. 2, 1917.
2 SHEETS—SHEET 2.
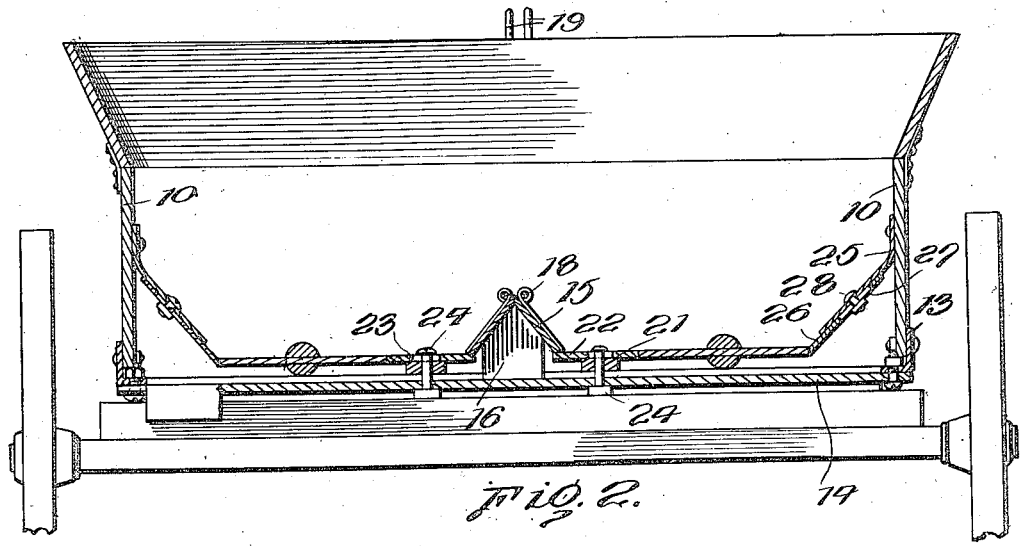
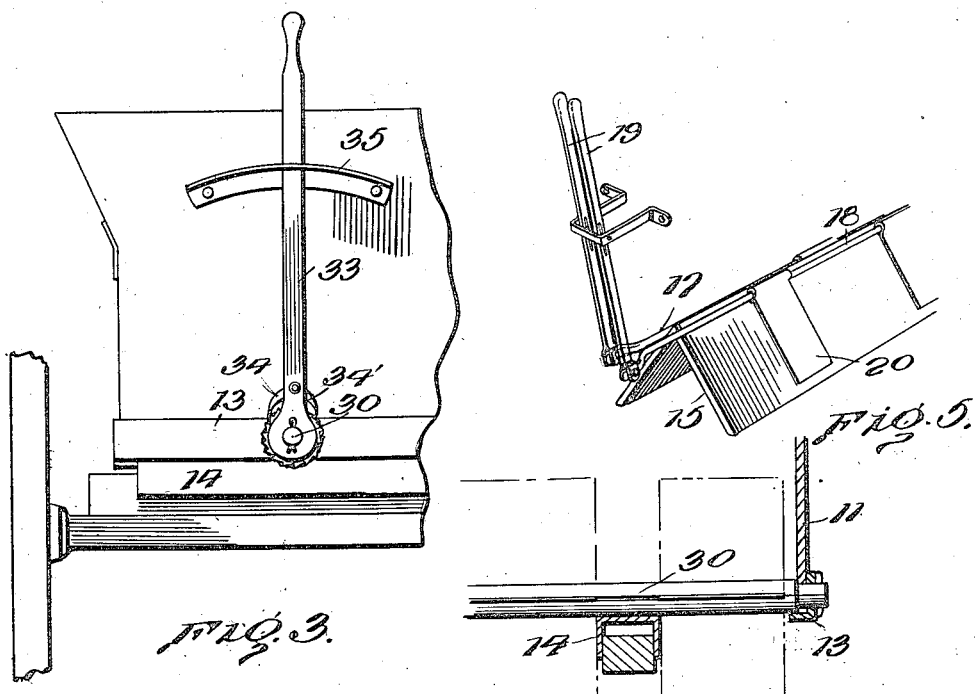
Inventor
William McEwan
By
Attorneys

UNITED STATES PATENT OFFICE.

WILLIAM McEWAN, OF FREELAND PARK, INDIANA.

DUMPING-WAGON.

1,210,822.

Specification of Letters Patent.  Patented Jan. 2, 1917.

Application filed August 10, 1915. Serial No. 44,810.

*To all whom it may concern:*

Be it known that I, WILLIAM MCEWAN, a citizen of the United States, residing at Freeland Park, in the county of Benton and State of Indiana, have invented certain new and useful Improvements in Dumping-Wagons, of which the following is a specification.

This invention contemplates an improved dumping wagon and relates more particularly to improvements in the construction disclosed in my pending application for dumping wagon, filed March 3, 1914, Serial No. 822,215.

The invention has as its primary object to provide a body which may be applied to an ordinary farm wagon and which will include mechanism adapted for operation to dump the whole load, or a portion of the load at any desired point without interfering with the remainder of the load.

A further object of the invention is to provide an improved mechanism of this character including a deflector or dividing bar extending longitudinally of the wagon body and to also provide scrapers for the said bar adapted for operation to remove all dirt which may, for any reason, stick to the sides of the bar.

The invention has as a further object to provide an improved construction employing a single load supporting element upon each side of the dividing bar and wherein the said elements will be independently operable to dump a portion of the load. And the invention has as a still further object to provide the wagon body with a plurality of bed plates adjustable toward or away from said load supporting elements in the normal position thereof, so that the said plates may be so positioned that the wagon body will effectually hold sand or other fine material.

Other and incidental objects will appear as the description proceeds and in the drawings wherein I have illustrated the preferred embodiment of the invention and wherein similar reference numerals designate corresponding parts throughout the several views.

Figure 4:
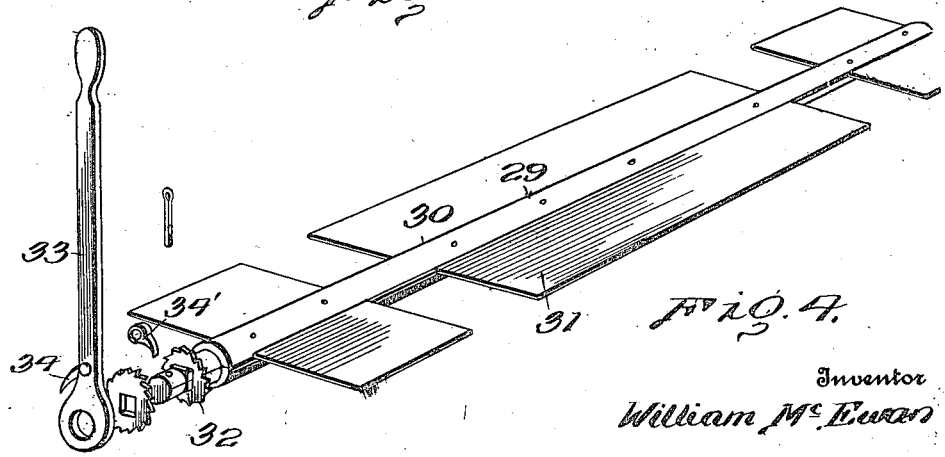

Figure 1 is a top plan view of my improved wagon body showing the load supporting elements in their normal position, Fig. 2 is a transverse sectional view more particularly showing the mounting and arrangement of the dividing bar upon the wagon body and the arrangement of the adjustable bed plate thereof, Fig. 3 is a fragmentary front elevation showing one of the operating levers for the load supporting elements, Fig. 4 is a detail perspective view showing one of the load supporting elements detached, Fig. 5 is a fragmentary perspective view of the dividing bar and the scrapers therefor, Fig. 6 is a fragmentary sectional view showing the channel irons employed for connecting the wagon body with the bolsters of the wagon.

In carrying out my invention, I employ a wagon body which includes longitudinal side members 10 which are connected by a front end member 11 and the rear end member 12. Extending around the body at the base thereof, are angle irons or straps 13 which are respectively connected to the side and end members of the said body. Supported at their extremities upon the angle irons 13 at the sides of the wagon body, are spaced transversely extending channel irons 14 particularly shown in Figs. 2 and 7 of the drawings. These channel irons are presented downwardly and are adapted to detachably receive the bolsters of the wagon, conventionally illustrated in the drawings.

Arranged midway the sides of the wagon body and extending longitudinally thereof, is a substantially V-shaped dividing bar 15. The dividing bar 15 may be formed of sheet metal or any other suitable material and is supported, at longitudinally spaced points, by blocks 16, which rest upon the channel irons 14 and are secured thereto in any suitable manner. Arranged to coöperate with each side of the dividing bar 15 is a scraper indicated as a whole at 17 in Fig. 5 of the drawings. Each of these scrapers includes a rod 18 which extends longitudinally of the dividing bar adjacent the apex thereof and is journaled at its extremities in the front and rear end members 11 and 12 of the wagon body to shift longitudinally thereon. Mounted upon each of the rods 18 are a plurality of scraping elements or fingers 20, which are fixed thereto at longitudinally spaced points and are adapted to seat flatly against the adjacent side of the dividing bar. These scraping elements 20 may be formed from pieces of suitable sheet metal bent at the inner extremities thereof to embrace the rods 18. Mounted upon the front wall 11 above the forward extremities of the rods 18, is a suitable bracket upon which are pivotally mounted levers 19 each of which is swingingly connected at its inner extremity, to one of the rods 18. As will be observed, the levers 19 are adapted for operation to shift the scraping elements.

It is to be noted that a scraper 17 is provided for each side of the dividing bar and that the said scrapers may be independently operated so that should the load upon one side of the wagon be dumped, the scraper coöperating with that side of the dividing bar may be operated to thoroughly remove all dirt therefrom.

Mounted upon the channel irons 14 upon opposite sides of the dividing bar 15 are longitudinally extending strips or cleats 21 upon which are mounted flat bed plates 22. The bed plates 22 are formed with transversely extending slots 23 which freely receive bolts or other suitable fastening devices 24 adjustably connecting the plates with the cleats. The inner confronting margins of the plates 22 are normally arranged to extend beneath the free edges of the dividing bar as particularly shown in Fig. 2 of the drawings and are adjustable beneath the dividing bar or away therefrom, for a reason which will presently appear.

Mounted upon the side members 10 of the wagon body at longitudinally spaced points, are brackets 25 which, at their free extremities, are arranged to extend downwardly and inwardly within the wagon body. Mounted upon the brackets, upon each side of the wagon body, is a bed plate 26. The bed plates 26 are provided with transversely extending slots 27 which freely receive bolts or other suitable fastening devices 28 for connecting the said bed plates with the free ends of the brackets. It will be readily seen that the bed plates 26 may be adjusted upon the brackets either toward or away from the side members 10 of the wagon body, to coöperate with the bed plates 22.

Arranged upon each side of the dividing bar 15 and disposed between the adjacent bed plates 22 and 26 of the wagon body is a load supporting element indicated as a whole in Fig. 4 of the drawings at 29. Each of these elements includes a shaft 30 which, at its extremities, is journaled in the angle irons 13 at the ends of the wagon body. The shaft 30 of each of these elements is preferably formed of mating sections, as more particularly shown in Fig. 4 of the drawings, between which are received a plurality of load supporting plates 31, the said sections being clamped against opposite sides of the said plates by a plurality of rivets or other suitable fastening means, holding the plates in position. If desired, each of the shafts 30 may be slotted longitudinally and the plates 31 inserted in said slots to be secured by fastening devices, this modification being entirely within the spirit of the present invention.

It will be noted that the plates 31 upon each of the shafts 30 are spaced to receive the channel irons 14 as particularly shown in Fig. 1 of the drawings, and are adapted to coöperate with the bed plates 21 and 26 in supporting the load. In this connection, attention is now directed to the fact that the bed plates 21 and 26 upon the respective sides of the dividing bar 15 may be adjusted either toward or away from the plates 31 of the load supporting element coöperating therewith and may be moved to abut the longitudinal edges of said last mentioned plates, to effectually close the wagon body. In this way, there will be no wide cracks between the plates 21 and 26 and the plates of the load supporting elements, in the normal position of the said elements, so that the wagon body may be effectually used in transporting sand or other fine material.

Keyed upon each of the shafts 30 of the load supporting elements at the forward extremities thereof is a pair of ratchets 32 and the adjacent ends of the shafts are each formed to freely receive an operating lever 33. Mounted upon each of the operating levers 33 is a pawl 34 adapted to coact with one of the ratchets of each pair, while a similar pawl 34' is pivotally connected to the front wall 11 of the body and is adapted to engage the other ratchet thereof. Secured to the forward end member 11 of the wagon body above the shafts 30 are segments 35 adapted to coöperate with the levers 32 for holding them stationary. As will now be observed, the levers 33 may be oscillated to rotate the load supporting elements for dumping the load. Furthermore, the load supporting elements may be independently operated so that, if desired, only a portion of the load will be dumped and in this connection, it will be observed that the operation of dumping a portion of the load will not affect the remainder of the load which will remain intact within the wagon body.

It will therefore be seen that I provide a very efficient construction for the purpose set forth since the wagon body may be employed in transporting fine material as well as coarse material and that the dumping mechanism employed, while being simple in construction, will, nevertheless, provide efficient means for depositing either a portion or the whole of the load, as desired.

Having thus described my invention, what I claim and desire to secure by Letters Patent is:

1. In mechanism of the character described, a frame, a dividing bar mounted thereon, a shiftably mounted load supporting element arranged upon each side of the dividing bar, and bed plates carried by the frame and adjustable relative to opposite sides of each of the said load supporting elements to coöperate therewith, with the said plates providing bottom wall sections for the frame.

2. In mechanism of the character described, a frame, a dividing bar mounted thereon, members mounted adjacent said dividing bar, bed plates carried by the said members and adjustable thereon toward or away from the dividing bar with the said plates providing bottom wall sections for the frame, and load supporting elements carried by the frame and adapted for movement to dump a load.

3. In mechanism of the character described, a frame, a dividing bar mounted thereon, load supporting elements carried by the frame and adapted for movement to dump a load, brackets carried by the frame, and bed plates adjustable upon said brackets toward or away from the said load supporting elements in the normal position of said elements with the said plates providing bottom wall sections for the frame.

4. In mechanism of the character described, a frame, transversely extending members carried by the frame, blocks mounted upon said members, a dividing bar carried by said blocks and provided with downwardly diverging sides, a scraping element arranged to coöperate with each side of the dividing bar and shiftable longitudinally thereof, cleats carried by said transversely extending members, bed plates carried by the cleats, load supporting elements mounted upon the frame and adapted for oscillation to dump a load, brackets carried by the frame, and bed plates carried by the brackets, the several bed plates being adjustable toward or away from the load supporting elements in the normal position of said elements.

5. In mechanism of the character described, the combination with a frame, a dividing bar carried thereby, and load supporting elements carried by the frame and adapted for movement to dump a load, of a scraping element mounted to coöperate with the dividing bar, and a lever for shifting the said element to scrape the said bar.

6. In mechanism of the character described, a frame, a dividing bar mounted thereon, load supporting elements carried by the frame, and bed plates operatively connected to the frame and shiftable to a position to coact with the said bar or to a position spaced therefrom.

7. In mechanism of the character described, a frame, load supporting elements carried by the frame, and bed plates slidably adjustable upon the frame to coact with said load supporting elements for closing the space between the said elements and the sides of the frame with the said plates providing bottom wall sections for the frame.

8. In mechanism of the character described, a frame, a dividing bar mounted thereon, load supporting elements arranged upon opposite sides of the dividing bar and revoluble to dump a load, and a scraping element mounted to coöperate with the dividing bar and movable longitudinally thereover in a plane at right angles to the path of movement of the said load supporting elements for scraping the said bar.

9. In mechanism of the character described, the combination with a frame, a dividing bar carried by the frame, load supporting elements carried by the frame and adapted for movement to dump a load, and means arranged at one end of the frame for actuating the said elements, of a scraping element mounted to coöperate with the dividing bar, and means arranged upon the frame between said first mentioned means for actuating the said scraping element to scrape the bar, with the said scraping element adapted to provide an agitator for loosening the load adjacent to the said bar.

10. In mechanism of the character described, the combination with a frame, a dividing bar mounted thereon, and load supporting elements carried by the frame and adapted for movement to dump a load, of a scraping element mounted to coöperate with the dividing bar and including a rod shiftable upon the frame adjacent the upper edge of the dividing bar, and a finger depending from the said rod to ride longitudinally over the dividing bar upon the movement of the rod.

11. In mechanism of the character described, the combination with a frame, a substantially V-shaped dividing bar mounted thereon, and load supporting elements carried by the frame and adapted for movement to dump a load, of scraping elements mounted to coöperate with the dividing bar and including rods arranged adjacent the apex of the bar and shiftable longitudinally thereof upon the frame, a plurality of fingers depending from the rods to lie against and conform to the outer inclined faces of the bar, and means for selectively shifting the said rods for scraping the bar.

In testimony whereof I affix my signature.

WILLIAM McEWAN. [L. S.]